(12) United States Patent
Movahed

(10) Patent No.: US 12,439,500 B2
(45) Date of Patent: Oct. 7, 2025

(54) METHODS AND SYSTEMS FOR COMMISSIONING DEVICES

(71) Applicant: SIGNIFY HOLDING B.V., Eindhoven (NL)

(72) Inventor: Kayvon Movahed, Decatur, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 395 days.

(21) Appl. No.: 18/027,194

(22) PCT Filed: Sep. 16, 2021

(86) PCT No.: PCT/EP2021/075422
§ 371 (c)(1),
(2) Date: Mar. 20, 2023

(87) PCT Pub. No.: WO2022/058403
PCT Pub. Date: Mar. 24, 2022

(65) Prior Publication Data
US 2023/0363070 A1    Nov. 9, 2023

Related U.S. Application Data

(60) Provisional application No. 63/080,970, filed on Sep. 21, 2020.

(30) Foreign Application Priority Data

Sep. 24, 2020 (EP) ..................... 20198126

(51) Int. Cl.
*H05B 47/19* (2020.01)
(52) U.S. Cl.
CPC ................... *H05B 47/19* (2020.01)

(58) Field of Classification Search
CPC ... H05B 47/19; H05B 47/1995; H05B 47/196
See application file for complete search history.

(56) References Cited

U.S. PATENT DOCUMENTS

| | | | |
|---|---|---|---|
| 2011/0001438 A1 | 1/2011 | Chemel et al. | |
| 2014/0088772 A1 | 3/2014 | Lelkens | |

(Continued)

FOREIGN PATENT DOCUMENTS

| | | |
|---|---|---|
| DE | 102016121977 A1 | 5/2018 |
| WO | 2012131631 A1 | 10/2012 |

OTHER PUBLICATIONS

Guan, Bo, et al., "An RSSI-Based Wireless Sensor Network Localization Algorithm With Error Checking and Correction," http://www.i-joe.org, https://doi.org/10.3991/ijoe.v13i12.7892, vol. 13, No. 12, 2017 (15 Pages).

*Primary Examiner* — Charles R Kasenge

(57) ABSTRACT

A method and system for auto-commissioning devices within a system. The auto-commissioning processes utilize a commissioning algorithm to assign weighted values to each device based on their locations relative to a selected primary device. Any device arranged at a sharp angle with respect to the primary device, e.g., at a right angle with respect to the primary device, at a mid-angle with respect to the primary device, or within a threshold value of a right angle or mid-angle with respect to the primary device is assigned the weighted value. In the commissioning processes described herein, devices assigned the weighted value are commissioned to the system. Once commissioned to the system, and as the devices are assumed to be arranged in a pattern that approximates a grid pattern, each device is snapped to a visual grid displayed to the user.

14 Claims, 8 Drawing Sheets

(56) References Cited

U.S. PATENT DOCUMENTS

| | | |
|---|---|---|
| 2014/0152505 A1 | 6/2014 | Kim et al. |
| 2014/0266908 A1 | 9/2014 | Pandey |
| 2018/0054876 A1 | 2/2018 | White et al. |
| 2020/0205272 A1 | 6/2020 | Gu et al. |
| 2020/0250352 A1* | 8/2020 | Wodrich .................. G01S 5/14 |

* cited by examiner

METHODS AND SYSTEMS FOR COMMISSIONING DEVICES

CROSS-REFERENCE TO PRIOR APPLICATIONS

This application is the U.S. National Phase application under 35 U.S.C. § 371 of International Application No. PCT/EP2021/075422, filed on Sep. 16, 2021, which claims the benefit of U.S. Provisional Patent Application No. 63/080,970, filed on Sep. 21, 2020 and European Patent Application No. 20198126.3, filed on Sep. 24, 2020. These applications are hereby incorporated by reference herein.

FIELD OF THE DISCLOSURE

The present disclosure is directed generally to Internet of Things (IoT) systems, specifically to systems and methods for commissioning IoT devices within an environment.

BACKGROUND

Modern internet-of-things (IoT) control systems can include a plurality of devices and components arranged in various patterns within an environment or location. For example, devices such as lighting fixtures or luminaires, sensors, switches and other components for operating lighting fixtures are typically installed according to a floor plan, e.g., at different physical locations resembling a grid pattern, and are communicatively connected to a control system or building server, via wired or wireless network connections.

These control systems typically utilize a commissioning process to correlate the physical locations of each fixture to unique digital identifiers within the control system to perform advanced lighting control operations. DE102016121977 discloses auto-commissioning of lighting devices. Currently, commissioning processes are the most time intensive and expensive part of IoT control system installation.

SUMMARY OF THE DISCLOSURE

The present disclosure is related to methods and systems for auto-commissioning devices within a system. The auto-commissioning processes discussed herein utilizes a commissioning algorithm to assign weighted values to each device based on their locations relative to a selected primary device. The algorithm can assign a heightened weighted value to any devices arranged at a sharp angle with respect to the primary device, e.g., at a right angle with respect to the primary device, at a mid-angle with respect to the primary device, or any device within a threshold value of a right angle or mid-angle with respect to the primary device. In the commissioning processes described herein, devices assigned a heightened weighted value are commissioned to the system before all others. Once commissioned to the system, and as the devices are assumed to be arranged in a pattern that approximates a grid pattern, each device is "snapped" to a visual grid displayed to the user.

In one example, there is provided a method for commissioning devices, the method comprising: selecting a primary device from a plurality of devices arranged in a grid pattern within an environment; receiving, at the primary device, a plurality of output signals from a plurality of secondary devices positioned within the environment; determining a location of each of the secondary devices relative to the primary device based on the angle of arrival and time of flight of the respective output signal; assigning, via an algorithm, a weighted value to any device arranged at a right angle with respect to the primary device, arranged at a mid-angle with respect to the primary device, or arranged within a threshold value of a right angle or mid-angle with respect to the primary device; wherein the right angle and the mid-angle are defined with respect to a two-dimensional polar coordinate grid with the primary device as the origin; and performing a first commissioning operation, wherein the first commissioning operation includes commissioning at least one secondary device having the weighted value indicative of a location at a right angle with respect to the primary device, a location at a mid-angle with respect to the primary device, or a location within the threshold value of a location at a right angle or mid-angle with respect to the primary device.

In one aspect, the threshold value is independently selectable.

In one aspect, the environment is a room or interior of a building. In one aspect, the method further includes: identifying a subset of the secondary devices not commissioned in the first commissioning operation.

In one aspect, the method further includes: selecting a new primary device from one of the commissioned devices commissioned in the first commissioning operation, and assigning, via the algorithm, the weighted value to any secondary device that was not commissioned in the first commissioning operation, that is arranged at a right angle with respect to the new primary device, arranged at a mid-angle with respect to the new primary device, or arranged within the threshold value of a right angle or mid-angle with respect to the new primary device.

In one aspect, the method further includes: performing a second commissioning operation, wherein the second commissioning operation includes commissioning at least one secondary device that was not commissioned during the first commissioning operation that was assigned the weighted value indicative of a location at a right angle with respect to the new primary device, a location at a mid-angle with respect to the new primary device, or a location within the threshold value of a location at a right angle or mid-angle with respect to the new primary device.

In one aspect, the primary device is selected based on its location proximate a corner within the environment or proximate a center of the environment.

In another example, there is provided a system for commissioning devices including: a plurality of devices arranged within an environment, wherein the plurality of devices comprises a primary device and a plurality of secondary devices, wherein each of the plurality of devices includes a communication module configured to send and/or receive communications, the communications module comprising a radio and/or antenna, the primary device comprising a processor configured to: receive a plurality of output signals from the plurality of secondary devices positioned in a grid pattern within the environment; determining a location of each of the secondary devices relative to the primary device based on the angle of arrival and time of flight of the respective output signal; assign, via an algorithm, a weighted value to any device arranged at a right angle with respect to the primary device, arranged at a mid-angle with respect to the primary device, or arranged within a threshold value of a right angle or mid-angle with respect to the primary device; wherein the right angle and the mid-angle are defined with respect to a two-dimensional polar coordinate grid with the primary device as the origin; and perform a first commissioning operation, wherein the first commissioning operation includes commissioning at least one secondary device having the weighted value indicative of a location at a right angle with respect to the primary device, a location at a mid-angle with respect to the primary device, or a location within the threshold value of a location at a right angle or mid-angle with respect to the primary device.

In one aspect, the threshold value is independently selectable.

In one aspect, the environment is a room or interior of a building.

In one aspect, the system includes a new primary device, the new primary device including a new processor, wherein the new processor is configured to: identify a subset of the secondary devices not commissioned in the first commissioning operation.

In one aspect, the processor is further configured to: assign, via the algorithm, the weighted value to any secondary device that was not commissioned in the first commissioning operation, that is arranged at a right angle with respect to the new primary device, arranged at a mid-angle with respect to the new primary device, or arranged within the threshold value of a right angle or mid-angle with respect to the new primary device.

In one aspect, the new processor is further configured to: perform a second commissioning operation, wherein the second commissioning operation includes commissioning at least one secondary device that was not commissioned during the first commissioning operation that was assigned the weighted value indicative of a location at a right angle with respect to the new primary device, a location at a mid-angle with respect to the new primary device, or a location within the threshold value of a location at a right angle or mid-angle with respect to the new primary device.

In one aspect, the primary device is selected based on its location proximate a corner within the environment or proximate a center of the environment.

In one aspect, the system also includes a display configured to provide a visual representation of the commissioned secondary devices and the primary device within a model of the environment, and a user interface configured to receive a user input to manually manipulate a visual representation of the positions of the commissioned secondary devices and primary device.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1:
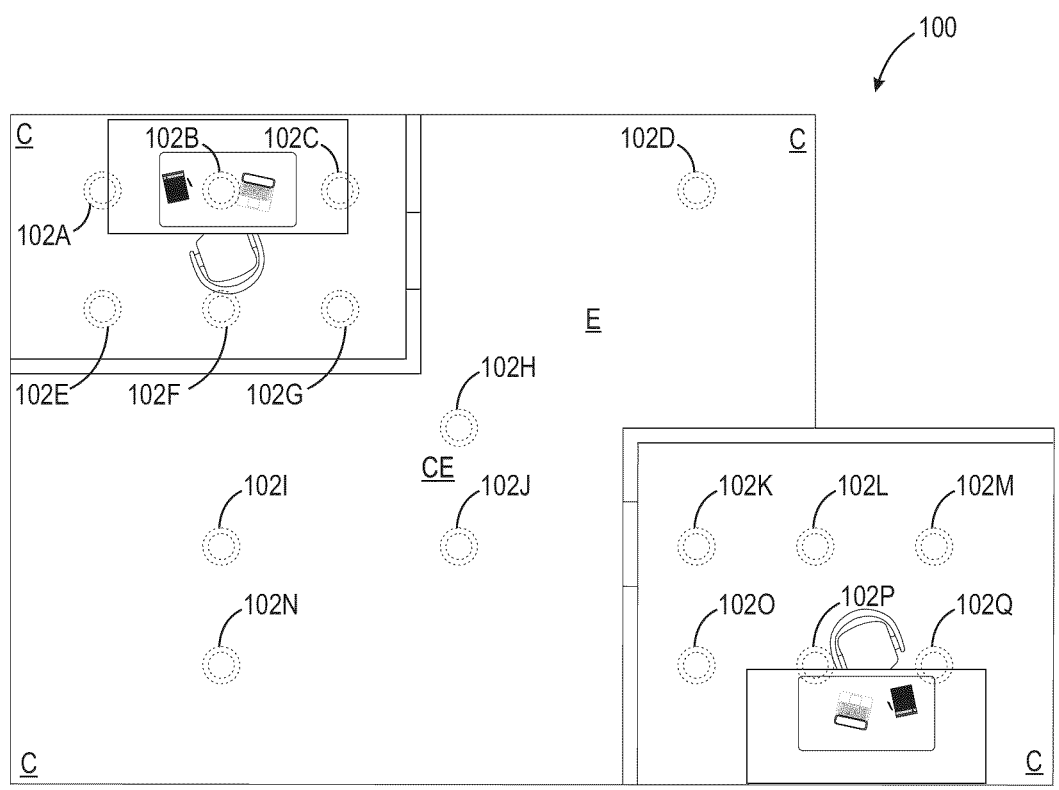
FIG. 1 is a schematic plan view of a system according to the present disclosure.

The present disclosure is related to methods and systems for auto-commissioning devices within a system. The auto-commissioning processes discussed herein utilizes a commissioning algorithm to assign weighted values to each device based on their locations relative to a selected primary device. The algorithm also assigns a heightened weighted value to any devices arranged at a sharp angle with respect to the primary device, e.g., at a right angle with respect to the primary device, at a mid-angle with respect to the primary device, or any device within a threshold value of a right angle or half-angle with respect to the primary device. In the commissioning processes described herein, devices assigned a heightened weighted value are commissioned to the system before all others. Once commissioned to the system, and as the devices are assumed to be arranged in a pattern that approximates a grid pattern, each device is snapped to a visual grid displayed to the user. The following description should be read in view of FIGS. 1-7. FIG. 1 illustrates a schematic plan view of system 100 within environment E according to the present disclosure. As illustrated, system 100 includes a plurality of devices 102A-102Q (collectively referred to herein as "devices 102" or "plurality of devices 102"). Each device 102 is intended to be an internet-of-things (IoT) device, e.g., a lighting fixture or any device capable of establishing a wired or wireless connection with one or more of the other devices 102 or additional devices, e.g., peripheral devices like cell phones, smart phones, laptops, tablets, personal computers (PC), wireless routers or internet access points, switches, etc. These devices 102 may also include one or more sensors 116 (discussed below). In some examples, devices 102 can be tile sensors, wireless internet routers, wireless transponders or access points, wireless extenders, alarms, smoke detectors, occupancy sensors, thermal sensors, or any device that when installed within a room or building is typically installed in a pattern that approximates a grid pattern. In some examples, as illustrated in FIG. 1, each device 102 can be a wall-mounted or ceiling mounted lighting fixture that, when energized, is configured to illuminate at least a portion of environment E. As described above, when installed, each device 102 of system 100 is installed in a pattern that approximates a grid pattern, i.e., a pattern where each device is installed along an imaginary horizontal or vertical line where the horizontal and vertically lines are equally spaced with respect to each other. As will be discussed below, by installing the devices 102 in a pattern that approximates a grid pattern, the commissioning algorithm 130 (discussed below) can provide enhanced weight to devices 102 that provide signals indicative of a position located at sharp angles, i.e., at right-angles or mid-angles (discussed below) with respect to a primary device or anchor device (also discussed below).

As discussed above, system 100 can be provided or installed within environment E. As shown in FIG. 1, environment E is intended to be an indoor space such as floor of an office building or a room within an enclosed structure. Within indoor spaces and in smaller areas, e.g., individual rooms, there is a heightened need for the locations of devices 102 to be determined with a higher degree of precision. Outdoor commissioning systems often rely on civilian Global Positioning Systems (GPS) which are typically accurate to within several meters. However, in an indoor space, e.g., environment E, inaccuracy of more than several centimeters can effect the accuracy of the commissioned device locations to an unacceptable level for certain tasks or advanced lighting controls.

Figure 2:
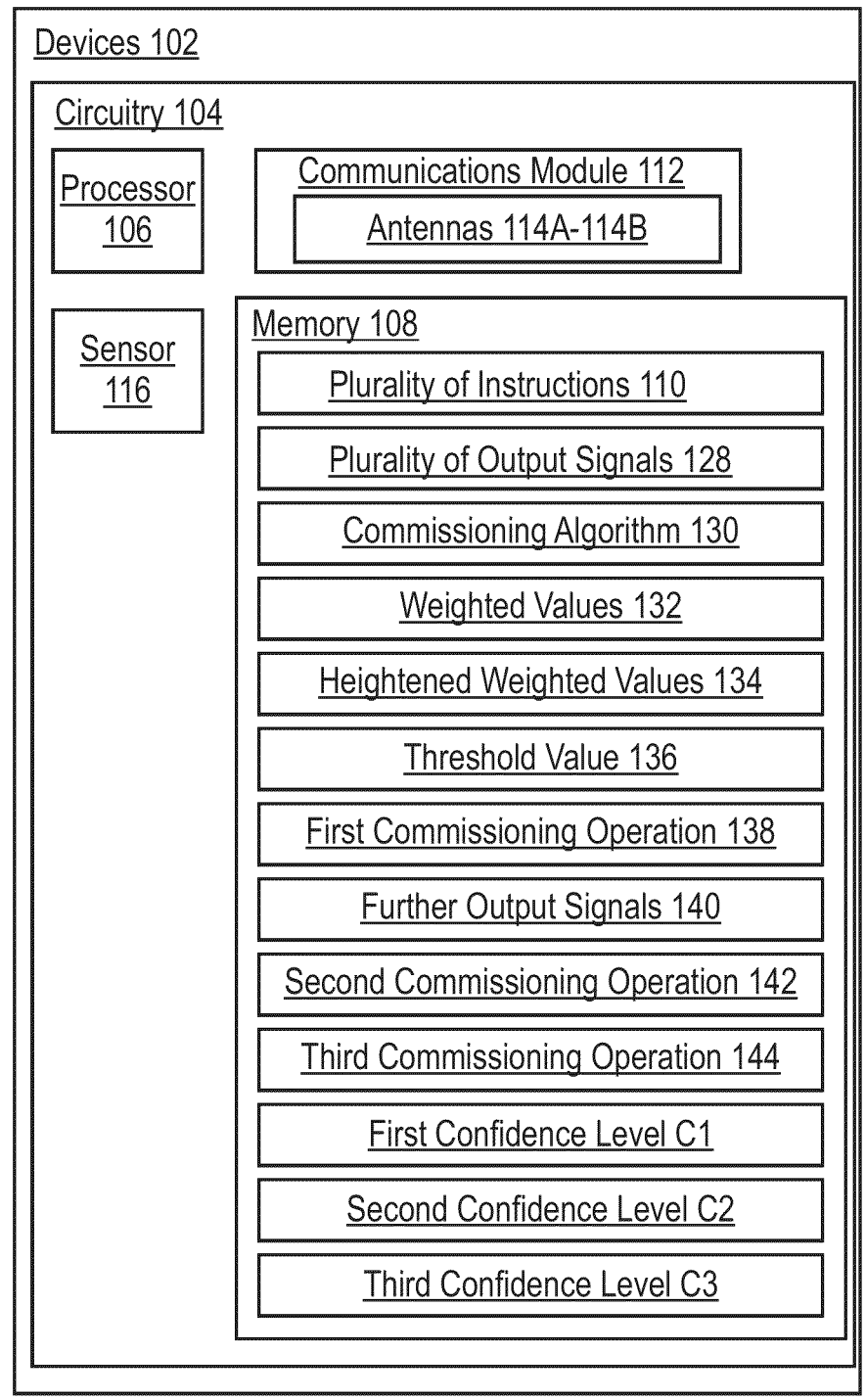
FIG. 2 is a schematic representation of the components of the devices of a system according to the present disclosure.

As illustrated in FIG. 2, each device 102 can include circuitry 104 which includes a respective processor 106 and memory 108, configured to executed and store, respectively, a set of non-transitory computer-readable instructions 110 to perform the functions of each device 102 and circuitry 104 as disclosed herein. Circuitry 104 can also include a communications module 112 configured to send and/or receive wired or wireless communications between devices, e.g., between each device 102 or between a peripheral device as discussed above. To that end, communications module 112 can include at least one radio or antenna, e.g., antenna 114A, capable of sending and receiving wireless data. In some examples, communications module 112 can include, in addition to at least one antenna (e.g., antenna 114A), some form of automated gain control (AGC), a modulator and/or demodulator, and potentially a discrete processor for bit-processing that are electrically connected to processor 106 and memory 108 to aid in sending and/or receiving wireless data. As will be discussed below, each antenna of each communications module 112 can be configured to send and/or receive one or more output signals from a plurality of output signals 128 sent from plurality of devices 102. In further examples, the circuitry of each device 102, i.e., circuitry 104, can include more than one antenna, e.g., antennas 114A and 114B such that angle of arrival and/or angle of departure (discussed below) of each received signal can be calculated.

Each device 102 can further include one or more sensors 116 electrically connected to circuitry 104. For example, sensors 116 can be selected from: optical sensors, proximity sensors, thermal sensors, occupancy sensors, daylight sensors, pressure sensors, humidity sensors, weather sensors, smoke or gas sensors, passive infrared sensors, microphones, cameras, or any other sensor used for advanced lighting controls.

Figure 3:
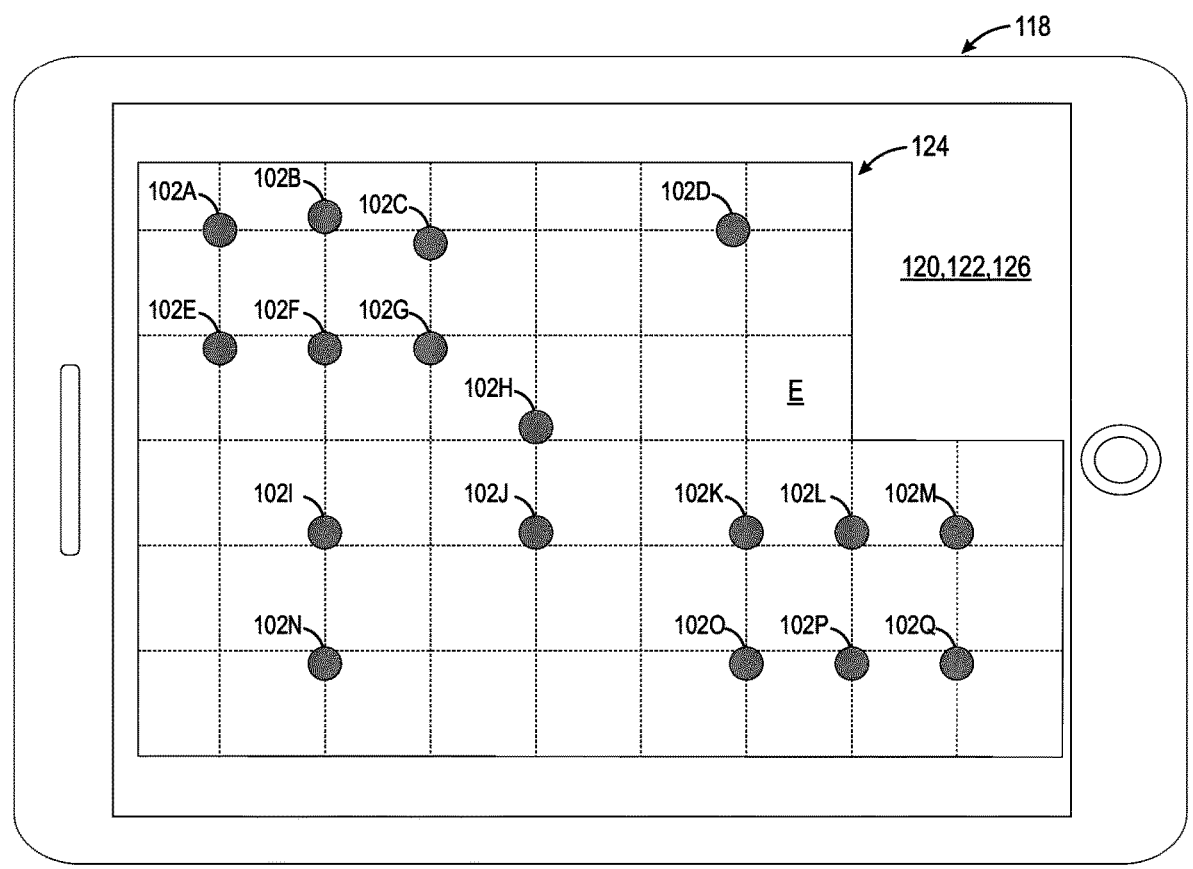
FIG. 3 is a schematic view of a peripheral device depicting a commissioning map according to the present disclosure.
Figure 4:
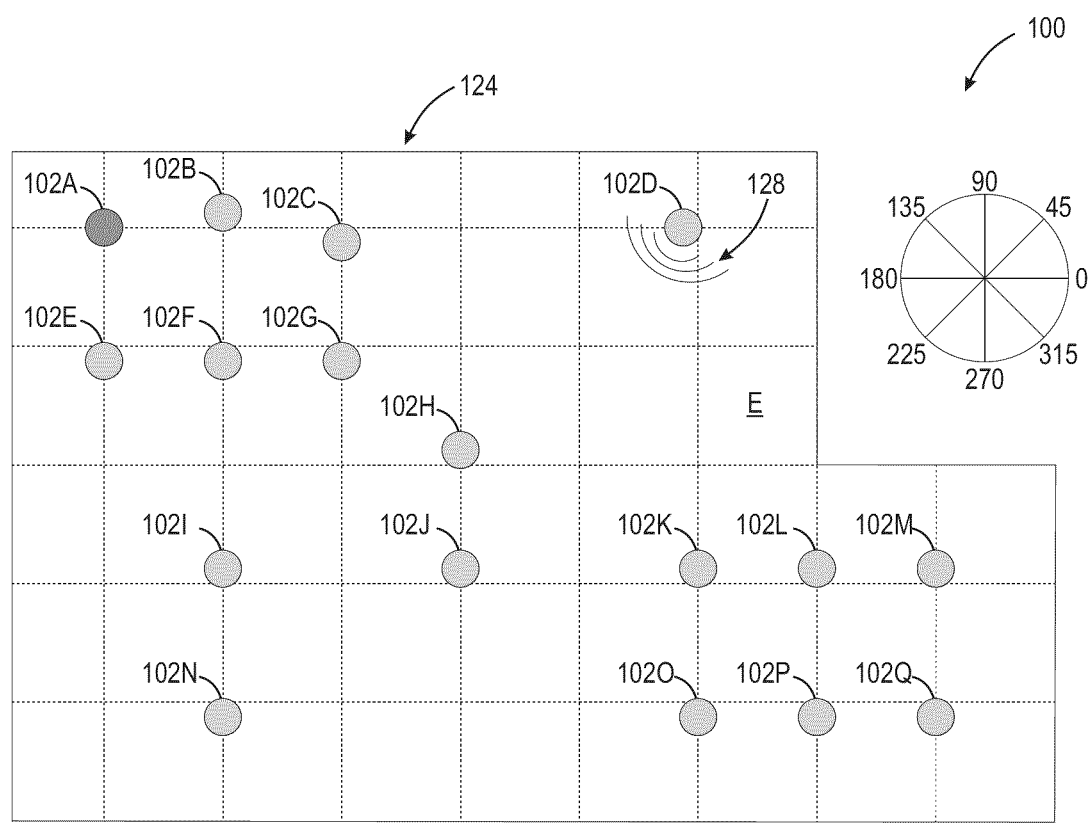
FIG. 4 is a schematic view of a commissioning map according to the present disclosure.

As illustrated in FIG. 3, system 100 can also include one or more peripheral device, e.g., peripheral device 118. Although peripheral device 118 is illustrated as a tablet, it should be appreciated that peripheral device 118 can be selected from a smart phone, laptop, personal computer (PC), or any other device capable of receiving wired or wireless signals from devices 102, e.g., plurality of output signals 128 (discussed below). Similarly to each device 102 of system 100, peripheral device 118 can also include peripheral circuitry that includes a respective peripheral processor and peripheral memory configured to executed and store, respectively, a peripheral set of non-transitory computer-readable instructions to perform the functions of peripheral device 118 as will be discussed herein. Accordingly, the circuitry of peripheral device 118 can include a peripheral communications module configured to send and/or receive wireless data, e.g., plurality of output signals 128 (discussed below). To that end, the peripheral communications module can include at least one peripheral antenna to send and receive wireless data.

In some examples, peripheral device 118 includes a display 120 and user interface 122 capable of displaying a commissioning map 124 and receiving a user input 126, respectively. Display 120 is intended to be a visual indicator or screen capable of providing a visual depiction of devices 102 before and after commissioning operations (discussed below) and their respective locations relative to each other within environment E. In one example, as illustrated in FIG. 3, and as will be discussed below, display 120 can include a screen capable of displaying a plurality of images, symbols, and/or text, related to the current locations of devices 102 within environment E. In one example, display 120 is a Liquid-Crystal Display (LCD) and may also include touch-screen functionality, e.g., is capable of utilizing resistive or capacitive sensing to determine contact with, and position of, a user's finger against the screen surface. It should also be appreciated that display 120 can be selected from at least one of: a Light-Emitting Diode (LED) screen, an Organic Light-Emitting Diode (OLED) screen, a plasma screen, or any other display technology capable of presenting the visual depiction of the current locations of devices 102 within environment E. On the body of peripheral device 118 or within the screen of display 120, peripheral device can include a plurality of buttons, touch-capacitive regions or switches capable of receiving user input 126, e.g., an affirmative user action. This collection of buttons, touch-capacitive regions, and/or switches serves as user interface 122, e.g., the collection of input options for the user to interact with peripheral device 118 and/or display 120. FIGS. 3-7 provide a schematic illustration of commissioning map 124. As illustrated, commissioning map 124 includes a spatial rendering and representation of environment E along with estimated and/or initial commissioned locations of devices 102. As will be described below with respect to FIGS. 4-7, during the auto-commissioning operation or operations, each device will send and receive output signals and a primary device (discussed below) will commission and snap to the grid devices 102 based on enhanced weighted values based on the devices 102 determined locations.

As discussed above, peripheral device 118 is intended to auto-commission devices 102 such that they are added to system 100. During the auto-commissioning process and/or operations discussed herein, each device 102 is configured to communicate, via plurality of output signals 128, with peripheral device 118 and/or a primary device (discussed below), and peripheral device 118 is configured to establish a permanent or semi-permanent wired or wireless connection with each commissioned device. It should be appreciated that the wired or wireless signals sent and/or received as plurality of output signals 128, can utilize a wired or wireless protocol selected from at least one of: a Bluetooth protocol, a Bluetooth Low-Energy (BLE) protocol, an LE Audio protocol, a ZigBee protocol, Near-Field Magnetic Induction (NFMI), Near-Field Electromagnetic Induction (NFEMI), Li-Fi, infrared optical protocols, a Wi-Fi (IEEE 802.11) protocol, or any other protocol for communicating wireless data between peripheral device 118 and each device 102 of system 100. Once commissioned, each device 102 is assigned a digital identity that can be displayed to a user via display 120. Additionally, as will be discussed below, each device 102 is displayed on commissioning map 124 at derived location relative to the primary device (discussed below).

Once installed within environment E, each device 102 can begin sending and receiving wireless data between other devices, e.g., via plurality of output signals 128. System 100 can utilize these initial output signals to perform an initial setup of commissioning map 124. For example, each output signal of plurality of output signals 128 can include sensor data, communication data, meta data, or any other form of data sent between the IoT devices 102. Upon receiving wireless data from a given device 102, each device can assess the received signal strength indicator (RSSI) value of the signal, and angle-of-arrival or angle-of-departure of a given signal to approximate the rough location of each device 102 within environment E, and visually present those locations to the user on commissioning map 124 as discrete icons at the rough locations of the devices. In some examples, the initial locations of devices 102, as displayed by the icons on commissioning map 124, may be inaccurate to several meters.

To improve the accuracy of the initial set up of these devices within system 100, the user may select a primary device or anchor node from the devices within the system 100 and provide it with an absolute location, and perform one or more commissioning processes or operations to improve the accuracy of the established locations of each device displayed on commissioning map 124 relative to the absolute position of the selected primary device. Thus, in some examples, the user may interact with user interface 122 of peripheral device 118, e.g., touching one of the device icons, to select a primary device, e.g., device 102A, from the plurality of devices 102 displayed on commissioning map 124. Although the examples that follow illustrate and describe primary device as device 102A, it should be appreciated that the primary device can be selected from any of the devices 102 within environment E. Alternative primary device selection will be discussed below. Once selected, the user may manually adjust the displayed location of the primary device, e.g., device 102A, on the displayed commissioning map 124. In one example, the user can press and drag the selected device icon to place the icon at a position within the displayed commissioning map 124 that matches its exact physical location within the environment E. In other examples, the user can interact with the user interface 122 to enter coordinates or distance measurements (e.g., length, width, height) to establish the absolute physical location of the primary device within environment E and accurately display that location on commissioning map 124. Once placed, the primary device, e.g., device 102A, is configured to receive at least one output signal from each device 102 within system 100, i.e., plurality of output signals 128. Upon receipt of each of these output signals, the primary device, e.g., device 102A, can utilize commissioning algorithm 130 to derive, determine, or otherwise calculate the locations of device 102 that produced each respective output signal.

For each output signal, commissioning algorithm 130 can utilize RSSI value, time-of-flight, time-difference-of-arrival, angle-of-arrival, angle-of-departure, or triangulation techniques to determine the locations of each device 102 within environment E relative to the primary device, e.g., device 102A, with increasing confidence. Given that devices 102 of system 100 are intended to be IoT devices arranged to approximate a grid pattern, commissioning algorithm 130 is configured to assign weighted values 132 to the identities of each device 102 based on the relative RSSI values, angles-of-arrival, or angles-of departure relative to the selected primary device, e.g., device 102A, and assigned heightened weighted values 134 to devices with perceived locations at sharp angles with respect to the primary device.

Sharp angles, as discussed herein are intended to include angles that are within a threshold value 136 of a right angle or within a threshold value 136 of a mid-angle. The term "right angle", in addition to its ordinary meaning to those skilled in the art, is intended to include multiples of 90 degree angles, e.g., 90 degrees, 180, degrees, 270 degrees, and 0/360 degrees. The term "mid-angle" as used herein is intended to mean the angle formed halfway between two right angles, e.g., angles at 45 degrees, 135, 225 degrees, 315 degrees. Thus, after selecting a primary device, e.g., device 102A, commissioning algorithm 130, when assigning weighted values 132 to each device 102 based on received output signals from each device 102, can assign heightened weighted values 134 to any device that provides a signal with an angle-of-arrival or angle-of-departure that indicates a device disposed at an angle within threshold value 136 of a sharp angle with respect to a two-dimensional polar coordinate grid having the primary device as its origin. In other words, any output signal received at an azimuth angle within threshold value 136 of 0/360, 45 degrees, 90 degrees, 135 degrees, 180 degrees, 225 degrees, 270 degrees, or 315 degrees is assigned a heightened weighted value 134. The threshold value 136 is intended to be a value that can be set by the user, i.e., independently selectable. For example, the user may specify, e.g., by interacting with user interface 122 of peripheral device 118, that threshold value 136 should be 5 degrees. By setting threshold value 136 at 5 degrees, this specifies to system 100 that any signal received at a sharp angle or within 5 degrees (plus or minus) of a sharp angle should be assigned a heightened weighted value 134. As the user may manually set the threshold value 136, it should be appreciated that the threshold value 136 is not limited to 5 degrees and may be selected or set from any threshold value between 0 and 45 degrees, e.g., 1 degree, 2 degrees, 5 degrees, 10 degrees, 15 degrees, 20 degrees, etc. In one example, threshold value 136 is selected from a range between 0 and 15 degrees. As will be discussed below, devices with heightened weighted value 134 are given priority when commissioning new devices to the system. Additionally, as used herein, the term "weighted value" is intended to mean a selectable value that is dependent on satisfying a certain condition. For example, a higher weighted value is given to situations or devices that are closer to satisfying a certain condition while lower weighted values are given to situations or devices that are farther from satisfying the condition. As such the term "heightened weighted value" is intended to mean a weighted value given to situations or devices that are closer to satisfying a particular condition, e.g., heightened weighted values 134 are intended to be assigned to devices arranged within a threshold value 136 of a sharp angle with respect to a primary device.

During operation, system 100 is configured to commission each device 102 to the system in one or more commissioning operations. As will be discussed below, each commissioning operation utilizes at least the data received at the primary device, e.g., RSSI values, angle-of-arrival information, angle-of-departure information, and/or triangulation information of the signals from each device, to establish more accurate location data of each device that has been, or is currently being, commissioned to the system. During a first commissioning operation 138, system 100 commissions all of the devices 102 with heightened weighted values 134, i.e., devices arranged within a threshold value 136 of right angles or mid-angles as discussed above. After the first commissioning operation 138, subsequent commissioning operations may utilize the data received at the primary device, as well as data received at each commissioned device to increase the accuracy of the location determinations of the remaining devices. In these subsequent commissioning operations, as each device or node within the network of devices can act as a receiver, triangulation techniques, in addition to or in the alternative to angle-of-arrival or angle-of-departure techniques, may be utilized to accurately commission new devices, e.g., devices that were not originally located within threshold value 136 of a right angle or a mid-angle with respect to the primary device.

Additionally, as each device 102 is presumed to be installed at locations that approximate a grid pattern, when each device is commissioned by commissioning algorithm 130, e.g., as devices 102 are added to system 100 based on their locations at sharp angles with respect to the selected primary device, each commissioned device is visually snapped to a grid pattern displayed on display 120 of peripheral device 118. In other words, once a device is located and added to system 100, e.g., based on angle-of-arrival information received at the primary device, the identity icon that corresponds with the added device displayed on commissioning map 124 is snapped to the closest grid intersection (i.e., the intersection of a horizontal line and vertical line as discussed above) to the device's approximate location within environment E. Once added to system 100, the added device maintains its own confidence level. For example, upon being added to the system, as its location on the grid may be derived from signal information obtained from only one device, e.g., the primary device, the newly added device may maintain a low confidence level in its assigned location, i.e., first confidence level C1. During each subsequent commissioning operation, and as more and more devices are added to the system to corroborate the location of the device, the confidence level of the device may rise to higher levels of confidence, e.g., to second confidence level C2 or third confidence level C3, which correspond with higher and higher confidence of the device's location.

Figure 5:
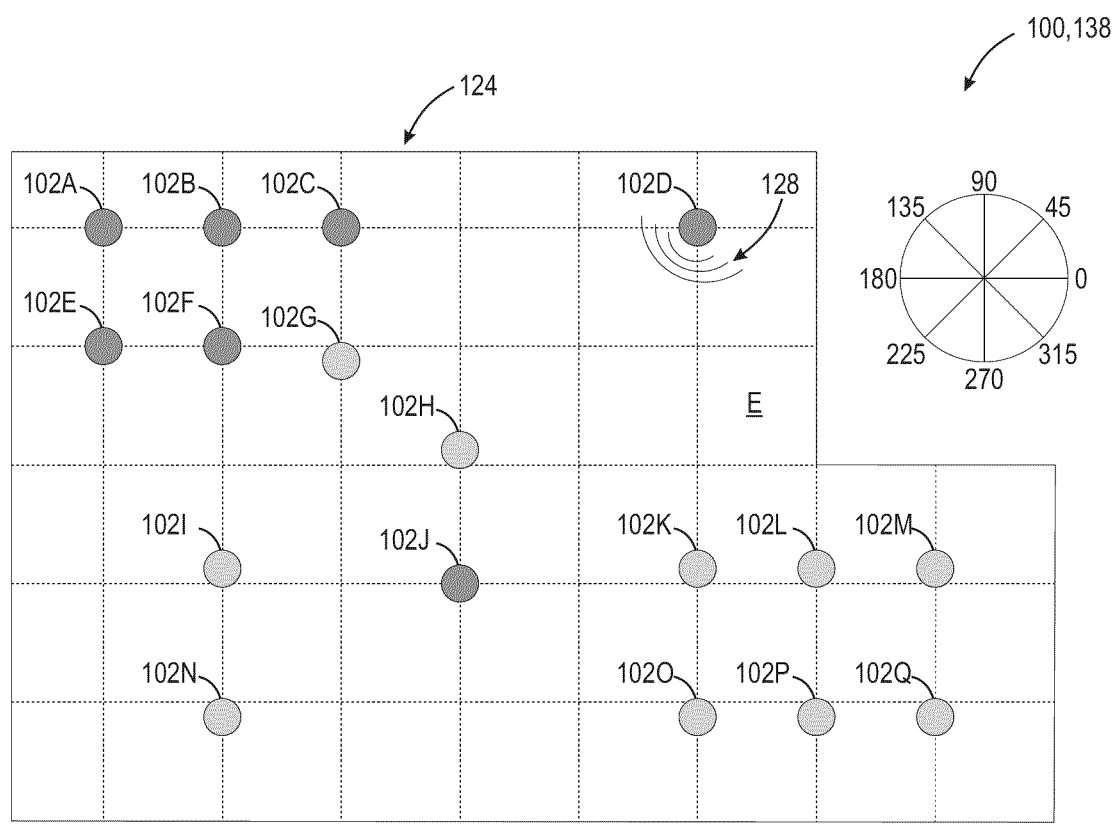
FIG. 5 is a schematic view of a commissioning map according to the present disclosure.

As illustrated in FIGS. 3-7, in one operational example, system 100 can include plurality of devices 102A-102Q. In this example, devices 102A-102Q are lighting fixtures each having one or more sensor 116 arranged thereon. As these lighting devices are typically installed over or in place of ceiling tiles within a building or room, each device 102A-102Q (collectively referred to herein as "devices 102" or "plurality of devices 102") is likely to be installed in a pattern that approximates a grid pattern. Once installed, the devices 102 can begin sending and receiving wired or wireless signals between each other. In this example, each device utilizes wireless Bluetooth protocols, and each device may begin sending or broadcasting advertising packets within environment E. Upon receiving these output signals 128, a peripheral device 118 arranged within the environment E is configured to perform an initial setup and provide a rough location for each device based on the advertising packets. These rough locations may be displayed as icons to a technician or user of the peripheral device 118 on display 120 shown in FIG. 3. As illustrated, each device 102A-102Q is initially provided at locations within environment E that do not entirely represent a grid pattern but approximate a grid pattern. Various sources may cause distortion of the exact location of the device 102A-102Q to not entirely represent a grid pattern, such as physical barriers that impact transmission of the broadcasted advertising packets, even though the device is actually installed in a grid form. The user may, using user interface 122 or by directly interacting with display 120, select a primary device. In this example, the user selects device 102A as the primary device (shown by a darker icon in FIG. 4). Once a primary device is selected, the user may initiate auto-commissioning of the remaining devices 102 of the system, i.e., the secondary devices. For example, in a first commissioning operation 138, commissioning algorithm 130 (executable on peripheral device 118 or the primary device) is configured to receive output signals 128 from each secondary device 102 within environment E and assess, determine, or otherwise calculate based on RSSI values and/or angle-of-arrival data of each signal 128, the angular position of each device and assign weighted values 132 (shown in FIG. 2) to each signal received. Any signal received at the primary device from an angle within a threshold value 136 (shown in FIG. 2) of a sharp angle, i.e., within a threshold value 136 of a right angle or within a threshold value 136 of a mid-angle with respect to a two-dimensional polar coordinate grid with the primary device as the origin (shown in FIG. 4-7), are given heightened weighted values 134 (shown in FIG. 2) and are commissioned to system 100. In this example, threshold value 136 is 5 degrees. Thus, in the first commissioning operation 138 (shown in FIG. 5), output signals 128 from devices 102B-102F, and 102J are all granted heighted weighted values 134. Specifically, devices 102B-102D are arranged within 5 degrees (threshold value 136) of a right angle, i.e., 0 degrees relative to primary device 102A; device 102E is arranged within 5 degrees of a right angle, i.e., 270 degrees relative to primary device 102A; and devices 102F and 102J are arranged within 5 degrees of a mid-angle, i.e., 315 degrees relative to primary device 102A. Each of these commissioned devices are illustrated as darker icons in FIG. 5. Now that devices 102B-102F, and 102J are commissioned to system 100, each of these devices maintains a confidence level, e.g., as each of these devices is being added to system 100 based on data received at only one device, i.e., primary device 102A, each of these devices may maintain a low confidence level, i.e., first confidence level C1 (shown in FIG. 2). Additionally, upon commissioning each of these devices to system 100, the respective icons associated with each device are snapped to the closest grid intersection to the approximate location of each device as shown in FIG. 5.

Figure 6:
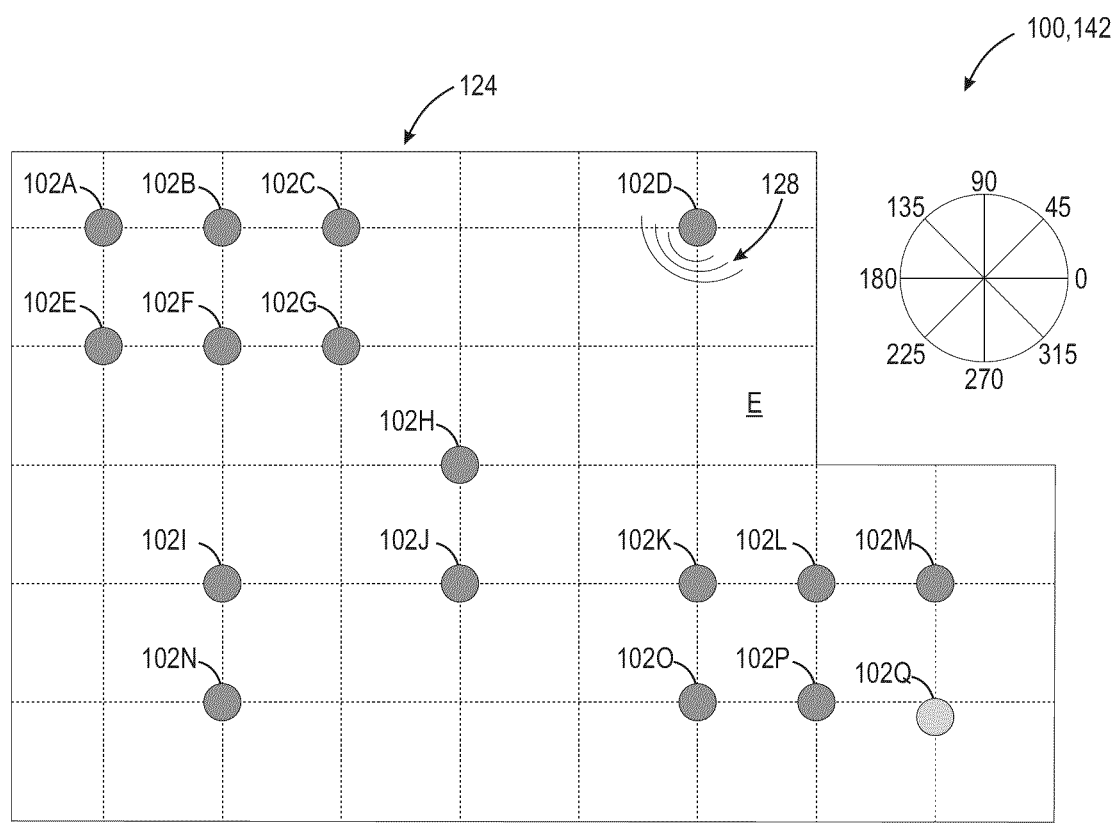
FIG. 6 is a schematic view of a commissioning map according to the present disclosure.

Once devices 102B-102F, and 102J have been commissioned to system 100, each of these devices can now receive a plurality of further output signals 140, i.e., output signals of plurality of output signals 128 from the remaining secondary devices not yet commissioned, to commission additional devices to the system. Additionally, devices 102B-102F and 102J can each continue to receive output signals from each other and further increase each device's respective confidence level in its own location on the grid of commissioning map 124. For example, as shown in FIG. 6, in the second commissioning operation 142, commissioning algorithm 130 assigns weighted values 132 to secondary devices 102G-102H, 102I, and 102K-102Q based on further output signals 140 received by commissioned devices 102A-102F and 102J. Additionally, commissioning algorithm 130 can assign heightened weighted values 134 to any uncommissioned secondary devices 102 that are positioned at locations within a threshold value 136 of sharp angles, i.e., right angles or mid-angles, with respect to any commissioned device (i.e., 102A-102F and 102J). Thus, in the second commissioning operation 142, further output signals 140 from secondary devices 102G-102I, and 102K-102P are all granted heighted weighted values 134.

Specifically, device 102G is arranged within 5 degrees (threshold value 136) of a right angle, i.e., 0 degrees relative to commissioned devices 102E and 102F, arranged within 5 degrees of a right angle, i.e., 270 degrees relative to commissioned device 102C, and arranged within 5 degrees of a mid-angle, i.e., 315 degrees relative to commissioned device 102B. Device 102H is arranged within 5 degrees of two mid-angles, i.e., 45 degrees relative to commissioned device 102D and 315 degrees relative to commissioned device 102B, and arranged within 5 degrees of a right angle, i.e., 90 degrees with respect to commissioned device 102J. Device 102I is arranged within 5 degrees of two right angles, i.e., 0 degrees with respect to commissioned device 102J and 270 degrees with respect to commissioned devices 102B and 102F. Device 102K is arranged within 5 degrees of two right angles and a mid-angle, i.e., 0 degrees with respect to commissioned device 102J, 270 degrees with respect to commissioned device 102D and 315 degrees with respect to commissioned device 102C. Devices 102L and 102M are arranged within 5 degrees of a right angle, i.e., 0 degrees with respect to commissioned device 102J. Device 102N is arranged within 5 degrees of a right angle and a mid-angle, i.e., 270 degrees with respect to commissioned devices 102B and 102F, and 225 degrees with respect to commissioned device 102D. Device 102O is arranged within 5 degrees of a right angle and a mid-angle, i.e., 270 degrees with respect to commissioned device 102D and 315 degrees with respect to commissioned device 102B. Device 102P is arranged within 5 degrees of a mid-angle, i.e., 315 degrees relative to commissioned device 102C. Upon commissioning each of these devices to system 100, the respective icons associated with each device are snapped to the closest grid intersection to the approximate location of each device as shown in FIG. 6, where the commissioned devices are illustrated as darker icons.

In addition to deriving the positions of uncommissioned secondary devices through angle-of-arrival techniques, commissioned and/or uncommissioned devices within the system can also derive angle-of-departure of the signals that each commissioned device outputs and use that information to commission new devices. It should be appreciated that, in addition to or in the alternative to granting heightened weighted values 134 to each device positioned at sharp angles with respect to other commissioned devices, data from output signals received at multiple commissioned devices can be used to triangulate the positions of uncommissioned devices. For example, rather than relying on angle-of-arrival or angle-of-departure calculations to commission device 102G in second commissioning operation 142, the output signal emitted by device 102G will be received at commissioned devices 102A-102F and 102J. As each of these commissioned devices has been snapped to the closest grid intersection, each device or peripheral device 118 can know the locations of each commissioned device and use these known locations along with the signals received by each device 102A-102F and 102J to triangulate the position of device 102G prior to commissioning that device to system 100.

Now that devices 102G-102I, and 102K-102P are commissioned to system 100, each of these devices maintains a confidence level. However, as each of these devices is being added to system 100 based on data received at multiple commissioned devices, i.e., at devices 102A-102F and 102J, each of these devices may maintain a higher confidence level, i.e., second confidence level C2 (shown in FIG. 2). Additionally, each device that was previously commissioned during first commissioning operation 138, can receive output signals 128 from the other commissioned devices 102A-102F and 102J and each device can utilize additional position information derived from angle-of-arrival, angle-of-departure, and/or triangulation techniques to increase each device's stored confidence level from, e.g., low confidence level C1 to a medium confidence level, i.e., second confidence level C2.

Figure 7:
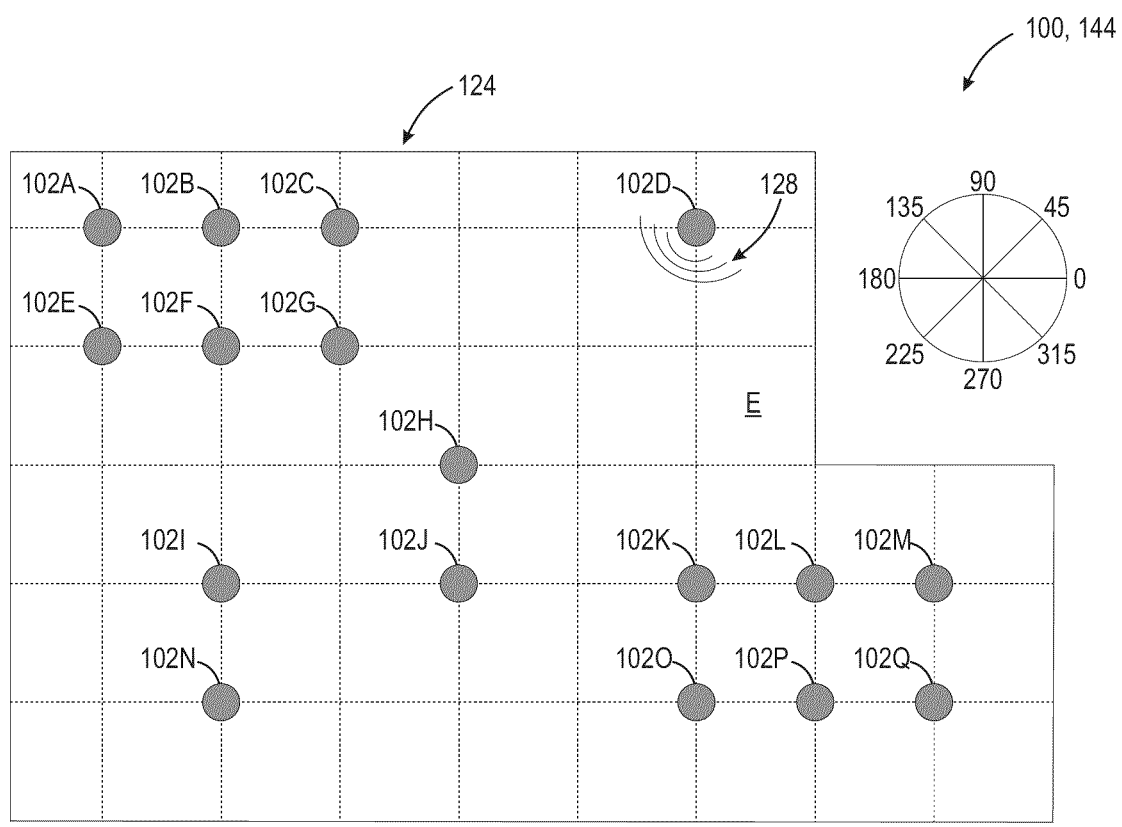
FIG. 7 is a schematic view of a commissioning map according to the present disclosure.

Once devices 102A-102P have been commissioned to system 100, each of these devices can now receive a further output signal 140, from any of the remaining devices not yet commissioned. In this example, only device 102Q remains uncommissioned. As shown in FIG. 7, in the third commissioning operation 144, commissioning algorithm 130 assigns weighted values 132 to any remaining device, i.e., 102Q, based on further output signals 140 received by commissioned devices 102A-102P. Additionally, commissioning algorithm 130 can assign heightened weighted values 134 to any uncommissioned secondary devices 102 that are positioned at locations within a threshold value 136 of sharp angles, i.e., right angles or mid-angles, with respect to any commissioned device (i.e., 102A-102P). Thus, in the third commissioning operation 144, a further output signal 140 from secondary device 102Q is granted heighted weighted value 134. Specifically, device 102Q is arranged within 5 degrees (e.g., within threshold value 136) of two right angles and a mid-angle of commissioned devices, i.e., at 0 degrees with respect to commissioned devices 102N-102P and 270 degrees with respect to commissioned device 102M, as well as 315 degrees with respect to commissioned device 102L. As mentioned above, rather than relying solely on angle-of-arrival and/or angle-of-departure techniques to commission device 102Q, further output signal 140 sent from device 102Q can be received at each commissioned device 102A-102P and triangulation techniques may be utilized to derive the location of device 102Q with a high degree of precision. Upon commissioning device 102Q to system 100, the icon associated with device 102Q is snapped to the closest grid intersection to the approximate location device 102Q as shown in FIG. 7, where the commissioned devices are illustrated as darker icons.

Now that device 102Q is commissioned to system 100, it maintains its own confidence level. As device 102Q is being added to system 100 based on data received at multiple commissioned devices, i.e., at least at devices 102L-102P, device 102Q may maintain a higher confidence level, i.e., second confidence level C2 (shown in FIG. 2). Additionally, each device that was previously commissioned during first commissioning 30 operation 138 and/or second commissioning operation, can receive output signals 128 from the other commissioned devices and each device can utilize additional position information derived from angle-of-arrival, angle-of-departure, and/or triangulation techniques to increase each device's stored confidence level from, e.g., low confidence level C1 to a medium confidence level, i.e., second confidence level C2 or from second confidence level C2 to a high confidence level C3.

It should be appreciated that rather than requiring a third commissioning operation 144 to commission device 102Q (as device 102Q is not positioned within a threshold value 136 of a sharp angle to any commissioned device), triangulation techniques using the devices commissioned to system 100 during the first commissioning operation 138 could commission device 102Q during the second commissioning operation 142 without using angle-of-arrival or angle-of-departure techniques. Additionally, although the auto-commissioning processes discussed herein are illustrated and described using commissioning algorithm 130 in three discrete operations or passes, i.e., first commissioning operation 138, second commissioning operation 142, and third commissioning operation 144, it should be appreciated that the auto-commissioning process could be a continuous fluid process or operation, i.e., a process that utilizes the available angle-of-arrival, angle-of-departure, and/or triangulation information available in real-time to add or commission each new device to system 100 sequentially based on available position data.

Additionally, as illustrated and described with the primary device being device 102A, it should be appreciated that any device 102 within system 100 can be selected by the user as the primary device during initial set up. In some examples, the user may be motivated to select a device or node that is positioned proximate a corner C of the environment E. For example, the user may select, as primary device, devices 102A, 102D, 102N or 102Q, as these devices are positioned roughly at the corner C of environment E and at a corner of the pattern of devices 102. It can be desirable to select a device proximate the corner C of the environment E as this limits the angles from which the primary device can receive incoming output signals 128 from the uncommissioned devices of system 100. For example, by selecting device 102A as the primary device in corner C of environment E, the primary device 102A will only receive output signals 128 within a 90 degree window, i.e., between 270 degrees and 0 degrees, i.e., the lower left quadrant of the illustrated two-dimensional polar coordinate grid. Narrowing the available angles of receipt, the accuracy of the first commissioning operation 138 may be enhanced. Additionally, after the initial setup it may be difficult to determine the locations of the devices within the system. Thus, selection of a device proximate the corner of environment E may be easier. Alternatively, the user may be motivated to select a device or node that is positioned proximate the center CE of environment E. For example, the user may select, as primary device, device 102H, as this device is positioned roughly at the center CE of environment E. Selecting the primary device as the device closest to the center CE of environment E will increase the angles from which the primary device can receive incoming output signals 128 from the uncommissioned devices of system 100. For example, by selected device 102H, the primary device 102H will receive output signals 128 from all directions and angles. By selecting a central device as the primary device, this may increase the commissioning speed of the system by reducing the number of commissioning operations required to commission all devices.

Furthermore, as described above, each device 102 commissioned to system 100 maintains its own confidence level. In some examples, as set forth above, these levels may be discrete levels, i.e., low, medium, or high (corresponding with first confidence level C1, second confidence level C2, and third confidence level C3, respectively). However, it should be appreciated that, the confidence maintained by each device commissioned to system 100, can be a numerical or percentage value between, for example, 0 and 100. For example, a low confidence level (e.g., first confidence level C1) can correspond to a numerical value or percentage including all values greater than or equal to 0 and less than or equal to 33; a medium confidence level (e.g., second confidence level C2) can correspond to a numerical value or percentage including all values greater than or equal to 34 and less than or equal to 66; and a high confidence level (e.g., third confidence level C3) can correspond to a numerical value or percentage including all values greater than or equal to 67 and less than or equal to 100.

Moreover, using, for example, user interface 122 of peripheral device 118, the user can set a global acceptable confidence level for every commissioned device within system 100. For example, the user interface 122 may present the user with a sliding scale input between 0 and 100, provided along a touch-capacitive region of display 120, or the user may manually input a numerical value by typing the value into an input region, to set a global acceptable confidence level for the commissioned devices of the system. Thus, the user may set or designate the global acceptable confidence level as, e.g., 80 percent, meaning that devices will only be commissioned to the system, (or they may be commissioned to the system but not displayed as commissioned to the user on commissioning map 124) until they can maintain a high confidence level of 80 percent. In order to compensate for an increased global acceptable confidence level, the system may automatically adjust the threshold value 136 such that more devices can be commissioned and the system can gradually increase the confidence of the devices added.

Although the foregoing examples assume that the initial set up and installation of device 102 positions each device 102 in a grid pattern, it should be appreciated that the devices 102 may be set up in other patterns, e.g., a pattern of concentric circles, or other geometric shapes, e.g., squares, rectangles, hexagons, octagons, etc. In these alternative patterns, it should be appreciated that the sharp angles that commissioning algorithm 130 grants heightened weighted values 134 to can be different angles, e.g., rather than being right angles and mid-angles, commissioning algorithm 130 may determine that other angles are more indicative to the pattern of devices, e.g., an angle-of-arrival indicative of a devices positioned at 110 degrees may be indicative of a device within an alternative pattern. Thus, algorithm 130 may prioritize other angles as sharp angles, e.g., angles between mid-angle and right angles such as 110, 115, 120, 125, etc.

Figure 8:
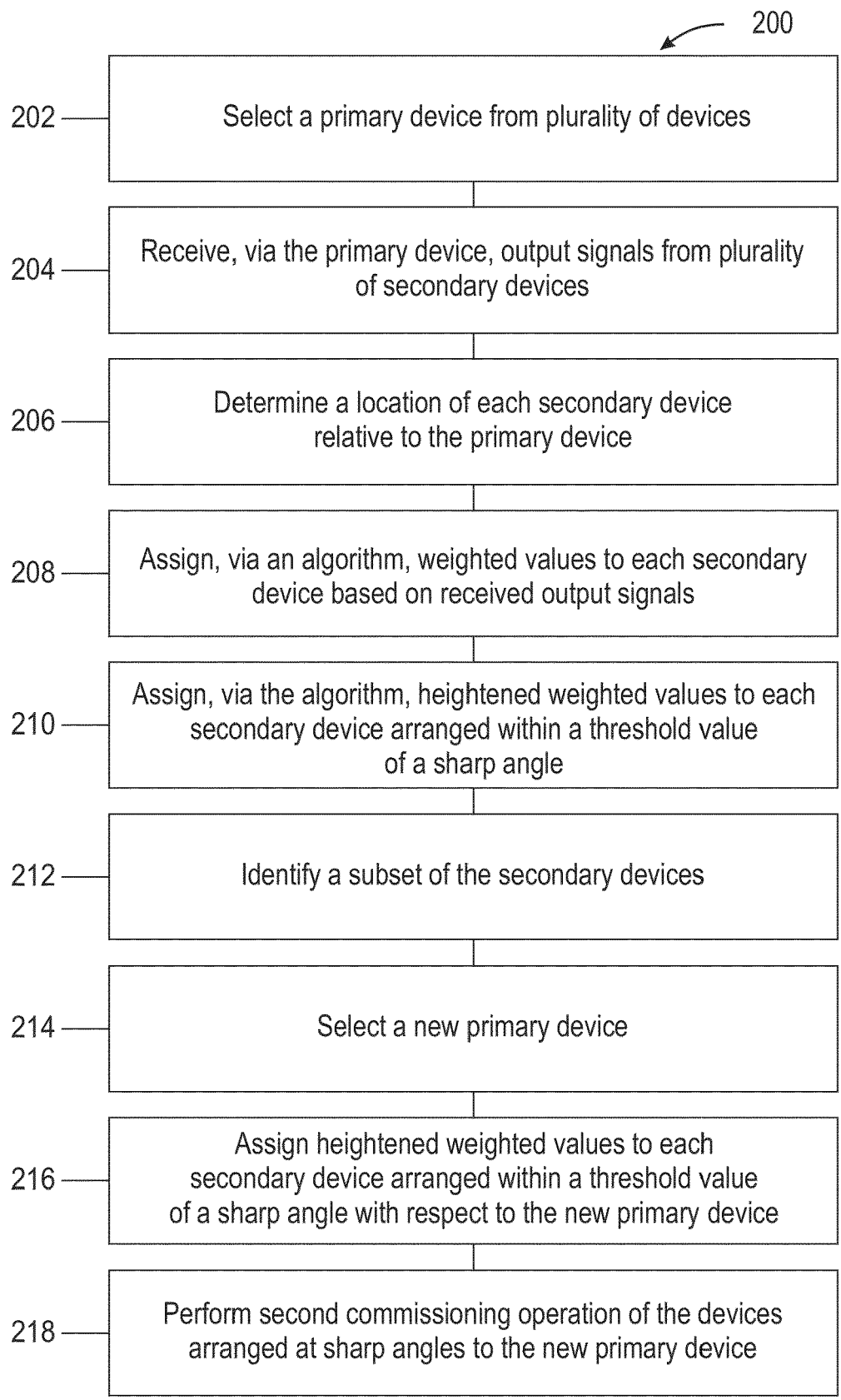
FIG. 8 is a flow chart illustrating the steps of a method according to the present disclosure.

FIG. 8 is a flow chart illustrating the steps of method 200 according to the present disclosure. As illustrated, method 200 can include, for example: selecting a primary device 102A from a plurality of devices 102A-102Q arranged within an environment E (step 202); receiving, at the primary device 102A, a plurality of output signals 128 from a plurality of secondary devices 102B-102Q positioned within the environment E (step 204); determining a location of each of the secondary devices 102B-102Q relative to the primary device 102A based at least in part on the angle-of-arrival and time-of-flight of the respective output signal 128 (step 206); assigning, via an algorithm 130, a weighted value 132 to each device 102 of the secondary devices 102B-102Q based on the plurality of output signals 128, wherein any device arranged at a right angle with respect to the primary device, arranged at a mid-angle with respect to the primary device, or arranged within a threshold value 136 of a right angle or mid-angle with respect to the primary device are given heightened weighted value 134 (step 208); and performing a first commissioning operation 138, wherein the first commissioning operation 138 includes commissioning at least one secondary device 102B-102Q having a heightened weighted value 134 indicative of a location at a right angle with respect to the primary device, a location at a mid-angle with respect to the primary device, or a location within a threshold value 136 of a location at a right angle or mid-angle with respect to the primary device (step 210). In some examples, method 200 also includes: identifying a subset of the secondary devices (102G-102I and 102K-102Q) not commissioned by the first commissioning operation 138 (step 212); selecting a new primary device 102B from one of the commissioned devices commissioned in the first commissioning operation 138 (step 214); assigning, via the algorithm 130, the weighted value 132 to each secondary device that was not commissioned in the first commissioning operation 138, wherein any secondary device arranged at a right angle with respect to the new primary device 102B, arranged at a mid-angle with respect to the new primary device 102B, or arranged within a threshold value 136 of a right angle or mid-angle with respect to the new primary device 102B are given heightened weighted value 134 (step 216); and performing a second commissioning operation 142, wherein the second commissioning operation 142 includes commissioning at least one secondary device that was not commissioned during the first commissioning operation 138 that was assigned a heightened weighted value indicative of a location at a right angle with respect to the new primary device 102B, a location at a mid-angle with respect to the new primary device, or a location within a threshold of a location at a right angle or mid-angle with respect to the new primary device 102B (step 218).

In another operational example, system 100 includes plurality of devices 102A-102Q. In this example, devices 102A-102Q are lighting fixtures each having one or more sensor 116 arranged thereon. As these lighting devices are typically installed over or in place of ceiling tiles within a building or room, each device 102A-102Q (collectively referred to herein as "devices 102" or "plurality of devices 102") is likely to be installed in a pattern that approximates a grid pattern. As discussed above, it should be appreciated that other installation patterns may be utilized. Once installed, the devices 102 can begin sending and receiving wired or wireless signals between each other. In this example, each device 102 utilizes wireless Bluetooth protocols, and each device may begin sending or broadcasting advertising packets within environment E. Upon receiving these output signals 128, a peripheral device 118 arranged within the environment E is configured to perform an initial setup and provide a rough location for each device based on the advertising packets. These rough locations may be displayed as icons to a technician or user of the peripheral device 118 on display 120 shown in FIG. 3. As illustrated in FIG. 3, each device 102A-102Q is initially provided at locations within environment E that do not entirely represent a grid pattern but approximate a grid pattern. Various sources may cause distortion of the exact location of the device 102A-102Q to not entirely represent a grid pattern, such as physical barriers that impact transmission of the broadcasted advertising packets, even though the device is actually installed in a grid form. The user may, using user interface 122 or by directly interacting with display 120, select a primary device. In this example, the user initially selects device 102A as the primary device (shown by a darker icon in FIG. 4). Once a primary device is selected, the user may initiate auto-commissioning of the remaining devices 102 of the system, i.e., the secondary devices. For example, in a first commissioning operation 138, commissioning algorithm 130 (executable on peripheral device 118 or the primary device 102A) is configured to receive output signals 128 from each secondary device 102 within environment E and assess, determine, or otherwise calculate based on RSSI values and/or angle-of-arrival data of each signal 128, the angular position of each device and assign weighted values 132 (shown in FIG. 2) to each signal received. Any signal received at the primary device 102A from an angle within a threshold value 136 (shown in FIG. 2) of a sharp angle, i.e., within a threshold value 136 of a right angle or within a threshold value 136 of a mid-angle with respect to a two-dimensional polar coordinate grid with the primary device 102A as the origin (shown in FIG. 4-7), are given heightened weighted values 134 (shown in FIG. 2) and are commissioned to system 100. In this example, threshold value 136 is 5 degrees. Thus, in the first commissioning operation 138 (shown in FIG. 5), output signals 128 from devices 102B-102F, and 102J are all granted heighted weighted values 134. Specifically, devices 102B-102D are arranged within 5 degrees (threshold value 136) of a right angle, i.e., 0 degrees relative to primary device 102A; device 102E is arranged within 5 degrees of a right angle, i.e., 270 degrees relative to primary device 102A; and devices 102F and 102J are arranged within 5 degrees of a mid-angle, i.e.,
315 degrees relative to primary device 102A. Each of these commissioned devices are illustrated as darker icons in FIG. 5. Now that devices 102B-102F, and 102J are commissioned to system 100, each of these devices maintains a confidence level, e.g., as each of these devices is being added to system 100 based on data received at only one device, i.e., primary device 102A, each of these devices may maintain a low confidence level, i.e., first confidence level C1 (shown in FIG. 2). Additionally, upon commissioning each of these devices to system 100, the respective icons associated with each device are snapped to the closest grid intersection to the approximate location of each device as shown in FIG. 5.

Although not illustrated, following first commissioning operation 138, system 100 can be configured to identify a subset of the secondary devices that were previously commissioned in the first commissioning operation 138, e.g., system 100 is configured to identify previously commissioned devices 102B-102F, and 102J. Once identified, system 100 may select, automatically, one of the subset of commissioned secondary devices as the new primary device. For example, system 100 may select device 102B as the new primary device. Thus, once selected, new primary device 102B can now receive a plurality of further output signals 140, i.e., output signals of plurality of output signals 128 from the remaining secondary devices not yet commissioned, to commission additional devices to the system. Additionally, devices 102A, 102C-102F and 102J can each continue to send output signals to new primary device 102B and further increase each device's respective confidence level in its own location on the grid of commissioning map 124. For example, in a second commissioning operation 142, commissioning algorithm 130 assigns weighted values 132 to secondary devices 102G-102H, 102I, and 102K-102Q based on further output signals 140 received by new primary device 102B. Additionally, commissioning algorithm 130 can assign heightened weighted values 134 to any uncommissioned secondary devices 102 that are positioned at locations within a threshold value 136 of sharp angles, i.e., right angles or mid-angles, with respect to new primary device 102B. Thus, in the second commissioning operation 142, further output signals 140 from secondary devices 102G-102H 102I, 102N, and 102O are all granted heighted weighted values 134. Specifically, devices 102G-102H and 102O are arranged within 5 degrees (threshold value 136) of a mid-angle angle, i.e., 315 relative to new primary device 102B; devices 102I and 102N are arranged within 5 degrees (threshold value 136) of a right angle, i.e., 270 degrees relative to new primary device 102B. Upon commissioning each of these devices to system 100, the respective icons associated with each device are snapped to the closest grid intersection to the approximate location of each device.

Now that devices 102G-102H, 102I, 102N, and 102O, are commissioned to system 100, each of these devices maintains a confidence level. Additionally, as new primary device 102B can continue to receive output signals 128 from previously commissioned devices, e.g., device 102A-102C-102F and 102J, the data received at new primary device 102B from those previously commissioned devices may be used to increase each of those device's confidence level. For example, each of these devices is now associated with data received at multiple commissioned devices, i.e., at device 102A during the first commissioning operation 138 and at device 102B during the second commissioning operation 142. As such each commissioned device has two points of data related to their respective perceived positions within the grid and each of these devices may maintain a higher confidence level, i.e., second confidence level C2 (shown in FIG. 2).

The foregoing example commissioning operations can be iteratively performed until all devices within system 100 have been commissioned and maintain a selectable confidence level. For example, system 100 can iteratively select a new primary device from any device previously commissioned, e.g., any device commissioned in the first commissioning operations 138 or the second commissioning operation 142. Once selected that new primary device can receive output signals 128 from each uncommissioned device and other previously commissioned devices to commissioned new devices to the system and increase the confidence levels of each previously commissioned device.

Additionally, as set forth above with respect to other operational examples, the confidence levels used in the foregoing example may be discrete levels, i.e., low, medium, or high (corresponding with first confidence level C1, second confidence level C2, and third confidence level C3, respectively). However, it should be appreciated that, the confidence maintained by each device commissioned to system 100, can be a numerical or percentage value between, for example, 0 and 100. For example, a low confidence level (e.g., first confidence level C1) can correspond to a numerical value or percentage including all values greater than or equal to 0 and less than or equal to 33; a medium confidence level (e.g., second confidence level C2) can correspond to a numerical value or percentage including all values greater than or equal to 34 and less than or equal to 66; and a high confidence level (e.g., third confidence level C3) can correspond to a numerical value or percentage including all values greater than or equal to 67 and less than or equal to 100. Moreover, using, for example, user interface 122 of peripheral device 118, the user can set a global acceptable confidence level for every commissioned device within system 100. For example, the user interface 122 may present the user with a sliding scale input between 0 and 100, provided along a touch-capacitive region of display 120, or the user may manually input a numerical value by typing the value into an input region, to set a global acceptable confidence level for the commissioned devices of the system. Thus, the user may set or designate the global acceptable confidence level as, e.g., 80 percent, meaning that devices will only be commissioned to the system, (or they may be commissioned to the system but not displayed as commissioned to the user on commissioning map 124) until they can maintain a high confidence level of 80 percent. In order to compensate for an increased global acceptable confidence level, the system may automatically adjust the threshold value 136 such that more devices can be commissioned and the system can gradually increase the confidence of the devices added.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method for commissioning devices, the method comprising:
   selecting a primary device from a plurality of devices arranged in a grid pattern within an environment;
   receiving, at the primary device, a plurality of output signals from a plurality of secondary devices positioned within the environment;
   determining a location of each of the secondary devices relative to the primary device based on the angle of arrival and time of flight of the respective output signal;
   assigning, via an algorithm, a weighted value to secondary devices and a heightened weighted value to each device of said secondary devices that is arranged at a right angle with respect to the primary device, arranged at a mid-angle with respect to the primary device, or arranged within a threshold value of a right angle or mid-angle with respect to the primary device; wherein the right angle and the mid-angle are defined with respect to a two-dimensional polar coordinate grid with the primary device as the origin; and
   performing a first commissioning operation, wherein the first commissioning operation includes commissioning at least one secondary device having the heightened weighted value indicative of a location at a right angle with respect to the primary device, a location at a mid-angle with respect to the primary device, or a location within the threshold value of a location at a right angle or mid-angle with respect to the primary device.

2. The method of claim 1, wherein the threshold value is independently selectable.

3. The method of claim 1, wherein the environment is a room or interior of a building.

4. The method of claim 1, further comprising:
   selecting a new primary device from one of the commissioned devices commissioned in the first commissioning operation;
   identifying a subset of the secondary devices not commissioned by the first commissioning operation; and
   assigning, via the algorithm, the weighted value to any secondary device of the subset of secondary devices that was not commissioned in the first commissioning operation, that is arranged at a right angle with respect to the new primary device, arranged at a mid-angle with respect to the new primary device, or arranged within the threshold value of a right angle or mid-angle with respect to the new primary device.

5. The method of claim 4, further comprising:
   performing a second commissioning operation, wherein the second commissioning operation includes commissioning at least one secondary device that was not commissioned during the first commissioning operation that was assigned the weighted value indicative of a location at a right angle with respect to the new primary device, a location at a mid-angle with respect to the new primary device, or a location within the threshold value of a location at a right angle or mid-angle with respect to the new primary device.

6. The method of claim 1, wherein the primary device is selected based on its location proximate a corner within the environment or proximate a center of the environment.

7. A system for commissioning devices, the system comprising:
   a plurality of devices arranged in a grid pattern within an environment,
   wherein the plurality of devices comprises a primary device and a plurality of secondary devices,
   wherein each of the plurality of devices includes a communication module configured to send and/or receive communications, the communications module comprising a radio and/or antenna,
   wherein the primary device comprises a processor configured to:
   receive a plurality of output signals from the plurality of secondary devices positioned within the environment;
   determine a location of each of the secondary devices relative to the primary device based on the angle of arrival and time of flight of the respective output signal;
   assign, via an algorithm, a weighted value to the plurality of secondary devices and a heightened weighted value to each device of secondary devices that is arranged at a right angle with respect to the primary device, arranged at a mid-angle with respect to the primary device, or arranged within a threshold value of a right angle or mid-angle with respect to the primary device; wherein the right angle and the mid-angle are defined with respect to a two-dimensional polar coordinate grid with the primary device as the origin; and
   perform a first commissioning operation, wherein the first commissioning operation includes commissioning at least one secondary device having the weighted value indicative of a location at a right angle with respect to the primary device, a location at a mid-angle with respect to the primary device, or a location within the threshold value of a location at a right angle or mid-angle with respect to the primary device.

8. The system of claim 7, wherein the threshold value is independently selectable.

9. The system of claim 7, wherein the environment is a room or interior of a building.

10. The system of claim 7, further comprising a new primary device, selected from the commissioned devices of the first commissioning operation, the new primary device comprising a new processor, wherein the new processor is further configured to:
    identify at least one secondary device that was not commissioned in the first commissioning operation.

11. The system of claim 10, wherein the new processor is further configured to:
    assign, via the algorithm, the weighted value to each any secondary device that was not commissioned in the first commissioning operation, that is arranged at a right angle with respect to the new primary device, arranged at a mid-angle with respect to the new primary device, or arranged within the threshold value of a right angle or mid-angle with respect to the new primary device.

12. The system of claim 11, wherein the new processor is further configured to:
    perform a second commissioning operation, wherein the second commissioning operation includes commissioning at least one secondary device that was not commissioned during the first commissioning operation that was assigned the weighted value indicative of a location at a right angle with respect to the new primary device, a location at a mid-angle with respect to the new primary device, or a location within the threshold value of a location at a right angle or mid-angle with respect to the new primary device.

13. The system of claim 7, wherein the primary device is selected based on its location proximate a corner within the environment or proximate a center of the environment.

14. The system of claim 7, further comprising a display configured to provide a visual representation of the commissioned secondary devices and the primary device within a model of the environment, and a user interface configured to receive a user input to manually manipulate a visual representation of the positions of the commissioned secondary devices and primary device.

* * * * *